United States Patent
Dawande et al.

(10) Patent No.: US 6,321,132 B1
(45) Date of Patent: Nov. 20, 2001

(54) EFFICIENT METHOD FOR DESIGNING SLABS FOR PRODUCTION FROM AN ORDER BOOK

(75) Inventors: Milind Wasudeo Dawande, Peekskill; Jayant R. Kalagnanam, Tarrytown; Ho Soo Lee, Mount Kisco; Mark Elliot Trumbo, Pleasantville, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,825

(22) Filed: Aug. 5, 1998

(51) Int. Cl.[7] .................................................... G06F 19/00
(52) U.S. Cl. ................................ 700/97; 705/28; 705/29
(58) Field of Search ................................ 700/97; 433/49; 52/630; 705/28, 29

(56) References Cited

U.S. PATENT DOCUMENTS

| | | | |
|---|---|---|---|
| 5,706,688 | * 1/1998 | Dorricott | 72/203 |
| 5,808,891 | * 9/1998 | Lee et al. | 364/468.15 |
| 5,848,504 | * 12/1998 | Guerinet et al. | 52/177 |
| 5,902,371 | * 5/1999 | Frank | 75/10.12 |
| 5,924,318 | * 7/1999 | Dorricott | 72/203 |
| 6,044,361 | * 3/2000 | Kalagnanam et al. | 705/28 |

* cited by examiner

*Primary Examiner*—Ayaz Sheikh
*Assistant Examiner*—Firmin Backer
(74) *Attorney, Agent, or Firm*—McGuireWoods, LLP; Stephen C. Kaufman

(57) ABSTRACT

An efficient computer implemented method is used to design slabs for production from an order book. This method minimizes the number of slabs designed to fulfill an order book. This method is based on a heuristic algorithm which is a variant of the greedy approach for the set covering method. The variations are novel in three ways. First, designing slabs using the flexibility in the order size; second, using weight for choosing large slabs; and third, controlling the exponential nature of enumeration of the set of all subsets by constructing only the largest slab at each step.

3 Claims, 2 Drawing Sheets

EFFICIENT METHOD FOR DESIGNING SLABS FOR PRODUCTION FROM AN ORDER BOOK

CROSS-REFERENCE TO RELATED APPLICATION

The subject matter of this application is related to that of application Ser. No. 09/047,275 filed Mar. 24, 1998, by J. R. Kalagnanam, et al., for "A Fast Inventory Matching Algorithm for the Process Industry" and assigned to a common assignee herewith. The disclosure of application Ser. No. 09/047,275 is incorporated herein by reference.

DESCRIPTION

BACKGROUND OF TIE INVENTION

1. Field of the Invention

The present invention generally relates to operations planning in a process industry and, more particularly, to a method of designing a set of slabs from target orders in a near-optimal manner while satisfying design restrictions.

2. Background Description

General background information may be had by reference to the following two books:
1. Ahuja, R. K., Magnanti, T. L. and Orlin, J. B. (1993), *Network Flows*, Prentice Hall, N.J.
2. Horowitz, E. and Sahni, S. (1978), *Fundamentals of Data Structures*, Computer Science Press, Inc.

Operations planning in a process industry typically begins with a order book which contains a list of orders that need to be satisfied. The initial two steps in an operations planning exercise involves (1) first trying to satisfy orders from the order book using leftover stock from the inventory and (2) subsequently designing productions units for manufacture from the remaining orders. Two important characteristics of a process industry are that the products are all manufactured based on the orders instead of being based on a forecast of the expected demand (as in retail or semiconductor manufacturing) and, as a consequence, the inventory is merely the stock of previously produced units which for reasons of quality could not be shipped to the customer.

The subject invention is a novel and fast computer-implemented method for the second of these problems from an optimization perspective. The second problem, i.e., designing production units, involves using the order book to design the size and number of production units that need to be manufactured. The goal of this design is to minimize the number of units that need to be manufactured, which for a given order book is equivalent to maximizing the average size of the production unit. This problem has a strong flavor of a grouping exercise where different orders are grouped together to form a slab (the manufacturing unit in a steel industry)—we call this the slab design problem. There are, once again, several constraints regarding which orders can be grouped together, based on grade and surface quality and weight considerations, which give rise to integrality constraints. The maximum allowable size of a slab for a potential group of orders is constrained based on manufacturing considerations. Additionally, each designed slab needs to be of a minimum size, and any group of orders weighing less than this minimum introduces a designed slab with some partial surplus. The partial surplus is clearly undesirable and needs to be minimized. This problem can be formulated as a variation of the variable size bin packaging problem.

Characteristics of Orders and Slabs

In application Ser. No. 09/047,275, we introduced the inventory matching problem in terms of an order book which contains a list of orders and their specifications, and an inventory of existing slabs. Here, we provide a description of the order book which is similar to the one described in Ser. No. 09/047,275. We will also describe constraints that arise in designing virtual slabs. The specification of orders and the use of inventory (or slabs) has some unique attributes which are important in understanding the integer formulations that arise while modeling these problems.

The order book contains a list of orders from various customers. Each order has a target weight ($O_t$) that needs to be delivered. However, there are allowances with respect to this target weight which specify the minimum ($O_{min}$) and maximum weight ($O_{max}$) that are accepted at delivery. Over and above the total weight (per order) that needs to be delivered, there are additional restrictions regarding the size and number of units into which this order can be factorized at delivery. For example, with each order is associated a range for the weight of units which are delivered. We call the units to be delivered "Deliverable Production Units" or DPUs. Let us assume that the minimum weight for the deliverable production unit is $DPU_{min}$ and the maximum is $DPU_{max}$. Then, for each order we need to deliver an integral number of deliverable production units ($DPU_{number}$) of size in the interval $[DPU_{min}, DPU_{max}]$ so that the total order weight delivered is in the range $[O_{min}, O_{max}]$. In order to fulfill an order, we need to choose a size for the deliverable production unit ($DPU_{size}$) and the number of deliverable production units ($DPU_{number}$) to be produced such that $$O_{min} \leq DPU_{size} \times DPU_{number} \leq O_{max}$$
$$DPU_{min} \leq DPU_{size} \leq DPU_{max}$$
$$DPU_{number} \in \{0,1,2,\ldots\} \qquad (1)$$

Notice that the $DPU_{number}$ is a general integer variable. Additionally, the constraint represented by Equation (1) is a bilinear constraint.

In addition to the weight requirements, each order has four other classes of attributes, wherein (1) the first pertains to the quality requirements such as grade, surface anti internal properties of the material to be delivered; (2) the second set are physical attributes such as the width and thickness of the product delivered; and (3) the third set of attributes refer to the finishing process that needs to be applied to the deliverable production units. For example, car manufacturers often require the steel sheets to be galvanized. Finally, (4), the fourth set of attributes provides the maximum and the minimum slab size that can be used to produce this order. At first this may appear undesirable since the decision of how to manufacture slabs to fulfill an order should, in general, be left to a manufacturer. It turns out, however, that the maximum and minimum allowable slab size is in fact determined by the manufacturer based on the current technological limitations of process technologies. For example, in a steel mill, all slabs need to be hot rolled to produce units of desired physical dimensions. However, based on the width and thickness required and the quality requirements, the maximum size of the slab that can be hot rolled is constrained, and this determines the allowable maximum allowable slab size. Similar considerations are used to prescribe the minimum allowable slab size.

For the slab design problem, the dimensions of the slab are unknown. The objective of the slab design problem is to optimally design the dimensions of the slab, subject to various processing constraints which are described below.

The Slab Design Problem

The slab design problem requires that we design a minimal number of slabs to satisfy the order book, subject to constraints on the maximum allowable size for each of the designed slabs. It is possible to group multiple orders on the same designed slab. There are two considerations that arise in grouping multiple orders to the same slab:

1. Orders need to compatible in terms of physical dimensions in order to be grouped together. Orders that have similar width and thickness requirements can be packed together. As we had mentioned before for inventory matching according to Ser. No. 09/047,275, it is possible to alter the thickness and width (within a range) by rolling. Therefore, orders with thickness and width close to each other can be grouped on the same slab.

2. The second set of grouping constraints arise from process considerations in the hot/cold mill and the finishing line. These constraints can be represented using color constraints. More explicitly, we can associate with each order a color which represents the finishing operations that are required. As before, we can specify color constraints which limit the number of colors that can be grouped on each designed slab.

Orders that are grouped on the same slab might have different maximum allowable slab weights. However, when grouped as such, the allowable maximum slab weight is actually determined by the largest of all the allowable slab weights.

We therefore have a representation of the slab design problem in terms of multiple groups of orders, where each group can be packed on the same slab of a maximum allowable size. The maximum allowable slab size for each group can be different. Consider the (unlikely) case where all orders can be grouped together and we derive a corresponding allowable slab size. Ignoring the color constraints and decomposing all the orders into constituent production units, the slab design problem (of minimizing the number of slabs used to fulfill the order book) is exactly the same as a bin packing problem. We can now describe two variations to the simple bin packing problem that arise from our considerations:

1. In the first variation, we continue to assume a single group with a single allowable slab; however, we invoke the color constraints. This leads to a bin packing problem with colors constraints.

2. In the second variation, we relax our earlier assumption of having a single group. In place of that assumption we allow multiple groups with multiple corresponding allowable slab weights. We can represent this problem with a bipartite graph with a node for each order and a corresponding slab node for each group that multiple orders can be packed into. We use arcs from orders to slabs to indicate the assignment restrictions. This is a variable bin packing problem with color constraints. Note that if the bipartite graph is complete, then the problem degenerates to a single bin packing problem with the bin representing the slab of the largest allowable weight. However, with sparse assignment restrictions, the variable bin packing problem with color constraints constitutes an interesting variation of the original problem.

Notice that the variable size bin packing problem with color constraints is still an incomplete representation of the slab design problem where we have assumed the deliverable production unit size to decompose the orders.

Simplified Problem Formulation

TABLE 1

List of Notations

| | |
|---|---|
| $N=$ | Total number of orders. |
| $M=$ | Total number of slabs. |
| $N_i=$ | Set of slabs incident to order i. |
| $N_j=$ | Set of orders incident to slab j. |
| $P_i=$ | Maximum number of production units of order i required. |
| $L_j=$ | Maximum number of units of slab j required. |
| $O_{jl}^{ip}=$ | The weight of the $p^{th}$ DPU for order i obtained from the $l^{th}$ unit of slab j. |
| $z_{jl}^{ip}=$ | 1 if the $p^{th}$ DPU for order i is obtained from the $l^{th}$ unit of slab j; 0 otherwise. |
| $C_{jl}=$ | Set of colors incident on the $l^{th}$ unit of slab j. |
| $y_{jl}^{c}=$ | 1 if an order(s) of color c obtains material from the $l^{th}$ unit of slab j; 0 otherwise. |
| $W_{jl}=$ | Weight of the $l^{th}$ unit of slab j. |
| $PU_{min}^{i}, DPU_{max}^{i}=$ | Minimum and maximum production unit sizes, respectively, for order i. |
| $O_{min}^{i}, O_{max}^{i}=$ | Minimum and maximum order weight, respectively, for order i. |
| $s_{jl}=$ | 1 if the $l^{th}$ unit of slab j is used to supply some order(s); 0 otherwise. |

Problem Constraints

*Problem Constraints*

$$O_{min}^{i} \le \sum_{j=1}^{M}\sum_{l=1}^{L_j}\sum_{p=1}^{P_i} O_{jl}^{ip} \le O_{max}^{i}$$

$$\sum_{i=1}^{N}\sum_{p=1}^{P_i} O_{jl}^{ip} \le W_{jl}s_{jl} \quad 1 \le l \le L_j, 1 \le j \le M$$

$$O_{jl}^{ip} \le DPU_{max}^{i}y_{jl}^{c(i)} \quad 1 \le p \le P_i, 1 \le j \le N, p \le l \le L_j, 1 \le j \le M$$

$$\sum_{c \in c_{jl}} y_{jl}^{c} \le 2 \quad 1 \le l \le L_j, 1 \le j \le M$$

$$DPU_{min}^{i}z_{jl}^{ip} \le O_{jl}^{ip} \le DPU_{max}^{i}z_{jl}^{ip} 1 \le p \le P_i, 1 \le i \le N, p \le l \le L_j, 1 \le j \le M$$

$$z_{jl}^{ip} \in \{0, 1\} 1 \le p \le P_i, 1 \le i \le N, p \le l \le L_j, 1 \le j \le M$$

$$y_{jl}^{c} \in \{0, 1\} \quad \forall c \in C_{jl}, 1 \le l \le L_j, 1 \le j \le M$$

$$s_{jl} \in \{0, 1\} 1 \le l \le L_j, 1 \le j \le M$$

Problem Objectives

Minimize number of slabs:

$$\sum_{j=1}^{M}\sum_{l \in L_j} s_{jl}$$

Minimize surplus weight: A surplus is accounted for the $l^{th}$ slab of slab j only if we use the slab.

$$\sum_{j=1}^{M}\sum_{l=1}^{L_j}\left(W_{jl}s_{jl} - \sum_{i=1}^{N}\sum_{p=1}^{P_i} O_{jl}^{ip}\right)$$

Description of the Prior Art

According to one aspect of the prior art, a search for a solution to the slab design problem is done in the space of orders, creating a solution by selecting one order at a time. This search can be either a depth-first, breadth-first or a best-first. Therefore, the search progresses iteratively, expanding one node of assigning part of an order to an existing slab or creating a new slab at a time and then backtracking to cover all possibilities. Clearly, this is a naive approach to the search, as the computational burden relates exponentially to the problem size.

Techniques for pruning the search tree can alleviate this problem, provided we have good measures for pruning the search tree. The slab design problem can be formulated as an integer programming problem, as shown in the previous pages. A branch-and-bound technique is commonly used to solve such integer problems by solving a sequence of relaxed solution linear problems which are derived from the original problem.

The branching splits a linear program into two subproblems and bounding computes the upper bound for the objective function for each subproblem. If the upper bound for the subproblem is no better than the best integer solution found up to that point, then the entire subproblem is pruned from the search space. A branch-and-bound process can be represented by a tree, where every node in the tree represents a subproblem. At each stage of the branch-and-bound search, one active node is selected and the associated relaxed problem is solved. Depending on the solution one of the following three actions is taken: (1) if the relaxed problem has a solution that is worse than the current best feasible objective value, prune the node (pruning); (2) update the integer solution if the solution feasible and better than the current best feasible objective value (updating); and (3) branch on some edge in the bipartite graph if the relaxed solution is not feasible for the integer program and if its objective value is better than the current best feasible solution (branching).

Shortcomings of Traditional Search Based Approaches

The several shortcomings of this approach for the slab design problem are:

1. Because of its incremental approach to searching the space of matches, the speed of this algorithm depends critically on how close the actual optimal solution is to the relaxed solution generated by the linear program. For the slab design problem, both the integrality constraints of the $DPU_{number}$ and the color constraints render the relaxed problem to be a rather loose approximation to the actual problem. Hence, the branch-and-bound algorithm is very slow (a couple of hours) for even moderate sized problems. Such a response time is not acceptable in real world situations where the entire production plan (of which the slab design is a small part) has to be done within a couple of hours.
2. Finally the branch-and-bound algorithm can optimize for only one objective at a time. The slab design problem has two major competing objectives: maximize designed slab size and minimize partial surplus. In order to solve for both these objectives, the algorithm has to be applied once for each objective by constraining the other objective at some desirable goal. This procedure is repeated until no further improvement in both objectives can be achieved. Since the algorithm response for each objective is slow, such a goal programming approach is too slow for real world applications.

Accordingly, a main objective for the invention disclosed in this document is a fast heuristic algorithm which can solve the multi-objective slab design problem described before. An additional objective is a heuristic algorithm that can solve for multiple objectives simultaneously and generate multiple non-dominating solutions.

SUMMARY OF THE INVENTION

It is therefore an object of the present invention to provide a means to create multiple slabs from orders while satisfying all given restrictions and achieving near-optimization.

According to the invention, there is provided an efficient method for designing slabs for production from an order book. This method minimizes the number of slabs designed to fulfill an order book. This method is based on a heuristic algorithm which is a novel variant of the greedy approach for the set covering method. The variations are novel in three ways. First is designing slabs using the flexibility in the order size. The second is using weight for choosing large slabs. The third is controlling the exponential nature of enumeration of the set of all possible slabs by constructing only a cleverly chosen subset of slabs at each step. This invention has been successfully applied to a set of large instances for a leading steel manufacturer and has proved its performance, efficiency and quality of solutions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Set Covering Approach for Slab Design

Figure 1:
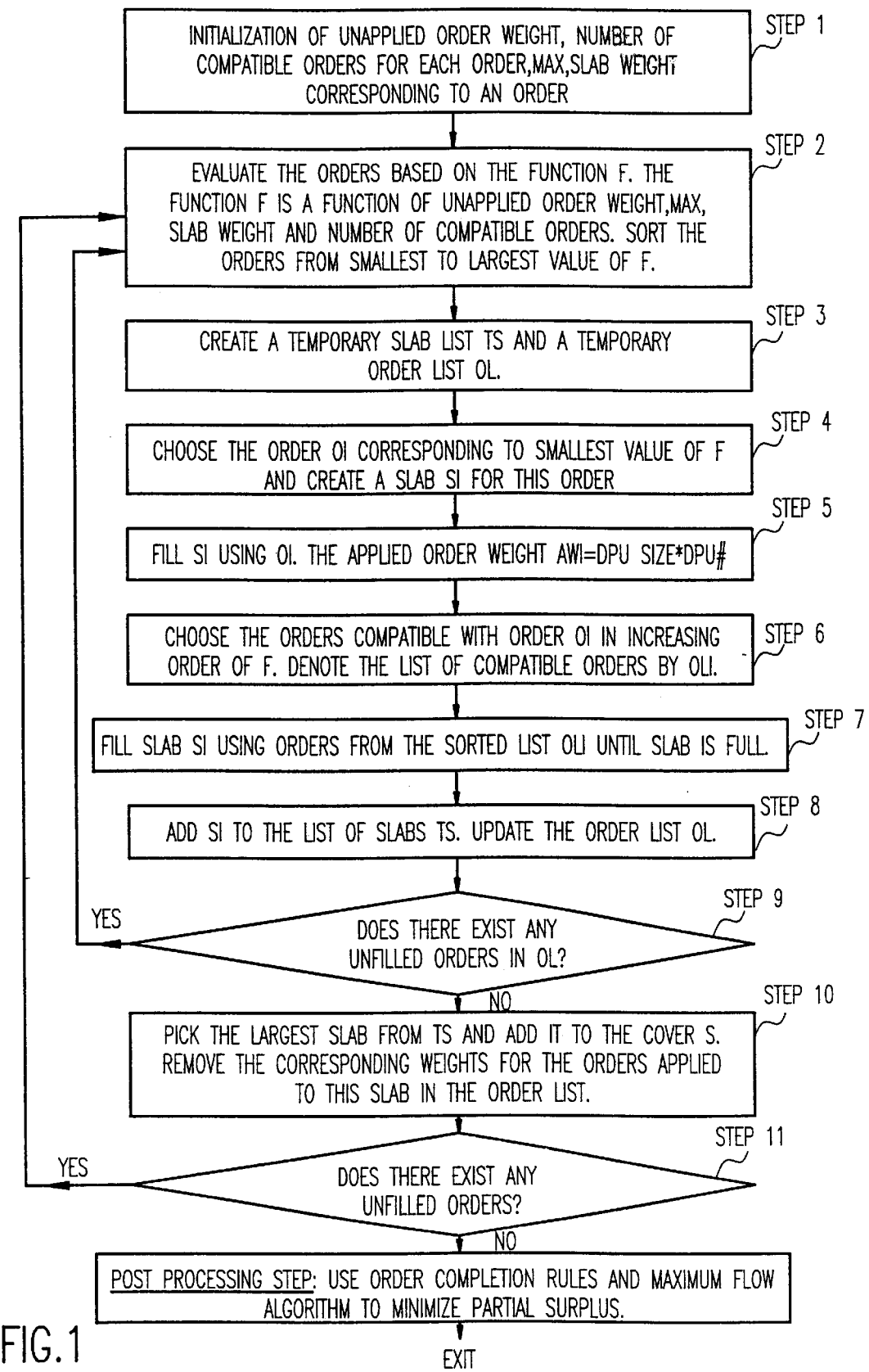
FIG. 1 is a flow diagram of the method for slab design according to the preferred embodiment of the invention.

The solution method for slab design is based on a set covering approach. The basic idea behind set covering is as follows: Given a base set S and a collection, F, of subsets of S, find a collection B* of subsets from F such that this collection covers all members of S and that the number of subsets in this collection is minimum.

In more formal terms, consider a set of items denoted by S. We denote a collection of subsets of S by $F=\{S_1, S_2, \ldots, S_n\}$ where $S_i$ is a subset of S. The objective is to find a minimum collection $B \subset F$ such that every element of S is covered.

A greedy algorithm for set covering is to start with an empty set B and pick the largest subset $S_i$ from F. $S_i$ is added to the cover B and all items of $S_i$ are then removed from the target set S. This is repeated until the target set is empty. This algorithm finds an approximation to the optimal solution that is no worse than log(d), where d is the size of the largest subset. We have extended this greedy algorithm to solve the slab design problem. For the purposes of exposition we will first describe a simplified version of the problem. Let us fix the $DPU_{size}$ for each order so that an integral number of these DPUs can be used to satisfy this order. We split the max order weight, $O_{max}^i$ into several production units of equal size, $O^i$, where $DPU_{min}^i \leq DPU_{max}^i \leq DPU_{max}^i$. For example, consider an order i with $O_{max}^i = 30$ tons, $DPU_{min}^i = 4$ tons and $DPU_{max}^i = 6$ tons. We split order i into six production units each having weight five tons. Note that if $O_{max}^i$ can be split into an integer number of production unit sizes between $DPU_{min}^i$ and $DPU_{max}^i$, then such a splitting is always possible. If $O_{max}^i$ is in the "block-out" region (i.e., it cannot be split into an integer number of production unit sizes between $DPU_{min}{}^i$ and $DPU_{max}{}^i$), we follow a conservative strategy to make $$\left\lfloor \frac{O^i_{max}}{DPU^i_{max}} \right\rfloor$$

production units, each of size DPU.

Now, the target set for slab design consists all the DPUs represented by the list where $DPU_i^j$ represents the $j^{th}$ of DPU for order i $$=\{DPU_1^1, DPU^{21}, \ldots, DPU_1^{N_1}, DPU_2^1, DPU^2{}_2, \ldots, DPU_2^{N_2}, \ldots, DPU_N^1, DPU_N^2, \ldots, DPU_N^{N_m}\}$$

The collection of all subsets is $$F = \left\{ V \in P \;\middle|\; s.t. \sum_{i \in V} DPU_i \le max_i(W^i_{max}) \right\}$$

where $W_{max}{}^i$ is the maximum allowable slab weight for order i.

The objective is to find the minimum size set B* of F that covers P. Note that F could be exponentially large since the different combinations of DPUs can be used to fill slabs.

Problem Representation

The slab design problem consists of an order book with a list of orders $O=\{O_1, O_2, \ldots, O_n\}$. The objective is to fulfill the order book by designing the minimum number of slabs. This optimization is constrained by a set of compatibility conditions which specify the set of orders that can be packed to the same slab. These compatibility conditions are shown in the table below.

TABLE 2

Compatibility Matrix

|  | $O_1$ | $O_2$ | $O_3$ | $O_4$ | $O_5$ | ... | $O_n$ |
|---|---|---|---|---|---|---|---|
| $O_1$ | x | x |  | x |  |  | x |
| $O_2$ |  | x | x |  |  |  |  |
| $O_3$ |  | x | x |  | x |  |  |
| $O_4$ |  |  |  | x |  |  |  |
| $O_5$ | x |  |  | x | x | x |  |
| . |  |  |  |  |  | x |  |
| . |  |  |  |  |  |  |  |
| . |  |  |  |  |  |  |  |
| $O_n$ |  | x |  | x |  |  | x |

Additional constraints require that at most two orders types (colors) can be packed on a slab. For any slab, the maximum and minimum allowable weight is determined by using the order with the largest maximum weight. If the total applied weight is less than the minimum slab weight then the slab is designed to the minimum weight and the extra weight is considered to be partial surplus.

The slab design problem is implemented on a computer using lists or sets. Two sets of lists are maintained, enumerated as (3) and (4) below:

3. The slab design problem is represented by a set of orders $O=\{O_1, O_2, \ldots, O_m\}$ in the order book.
4. The solution (or partial solution) is represented using a set of designed—slabs $S=\{S_1, S_2, \ldots, S_m\}$ A Method for Slab Design The set covering formulation can be modified to allow for the fact that the slab design has orders with variable DPU size and, additionally, the items (DPUs for slab design) have weights associated with them. There are three novel extensions that need to be made to accommodate the slab design problem.

1. We allow for the variable DPU size by filling a given slab weight W maximally by taking advantage of a range of DPU values instead of an item count.
2. Since each item has a weight, and the objective is to fulfill the total weight of a order book, we choose slabs having the largest weight rather than the maximum number of DPUs.
3. Finally, the exponential nature of enumeration of the set of all subsets is contained by constructing a cleverly chosen subset of slabs that can be designed at any given point and adding the largest slab to the cover.

The solution to the slab design problem is represented by a list of designed slabs $S=(S_1, S_2, \ldots, S_m)$ Each slab $S_i$ in the list S has associated with it a list of $SO_i$ of orders applied against it. Associated with each order in $SO_i$ is a DPU number and a DPU size, represented as $DPU_{number}$ and $DPU_{size}$, respectively, which indicates the applied quantity. Therefore, the list $SO_i$ is a list of tuples $$SO_i = \{\{Order_{ID}, DPU_{size}, DPU_{number}\}_1, \{Order_{ID}, DPU_{size}, DPU_{number}\}_2, \ldots, \{Order_{ID}, DPU_{size}, DPU_{number}\}_m\}.$$

The heuristic consists of two steps:

Modified Set Covering: A generative step where a solution of slabs is created using set covering based techniques, and Max Flow: A post processing step which creates a network flow representation and uses max flow analysis to minimize the unused weight on each slab.

These two steps are implemented as a computer program, the logic of which is shown in FIG. 1.

Modified Set Covering

With reference to FIG. 1, the step of modified set covering is first described.

Step 1 (Initialization): Let $RO^i$ denote the remaining weight for order i; $W_{max}{}^i$ denote the maximum slab weight corresponding to order i, and $N_i$ the number of orders compatible with order i. Let $RS_j$ denote the remaining weight of slab j designed to fill order i. Set $RO_i = O_{max}{}^i$ and $Rs_j = W_{max}{}^i$.

Step 2: Evaluate all orders in the order book represented by list O based on any function $$F \propto \left( \frac{1}{RO^i}, \frac{1}{W^i_{max}}, N_i \right)$$

and sort order list O in ascending order of function F.

Step 3 (inner Loop): Create a temporary slab list TS=Φ and temporary order list OL=O.

Step 4: Choose order i which has the smallest value of F (i.e., the head of the sorted list O and create a slab $S_i$ for this order.

Step 5: Fill Si using order $O_i$. The applied order weight $AW_i = DPU_{size} \times DPU_{number}$ where $DPU_{size}$ and $DPU_{number}$ is calculated as follows:

1. Let $RW_j^i = \min\{RO^i, RS_j\}$. For a order node i and a slab node j, if $$\left\lceil \frac{RW_j^i}{DPU_{\max}^i} \right\rceil = \left\lceil \frac{RW_j^i}{DPU_{\min}^i} \right\rceil \text{ then } RW_j^i = \left\lceil \frac{RW_j^i}{DPU_{\max}^i} \right\rceil DPU_{\max}^i$$

$$2. DPU_{number} = \left\lceil \frac{RW_j^i}{DPU_{\max}^i} \right\rceil \cdot DPU_{size}^i = \frac{RW_j^i}{DPU_{number}}$$

Step 6: Choose the orders compatible with $O_i$ sorted in increasing order of F. Denote this list of compatible orders as $OL_i$. Note that this list corresponds to the row of orders corresponding to $O_i$ in the matrix shown in Table 2.

Step 7: Fill slab $S_i$ using orders from $OL_i$ until the slab is full.

Step 8: Add slab $S_i$ to the list of temporary slabs TS. Note that $S_i$ is a list of tuples which indicates the orders, the $DPU_{size}$ and $DPU_{number}$ used to fill the slab. Update OL to reflect the applied order quantity.

Step 9 (End of Inner Loop): If there exist any unfilled orders in order list OL go to Step 3.

Step 10: Pick the slab SL with the largest weight in TS and add it to the permanent list of slab designs S and remove the corresponding weight for orders applied from the order list O.

Step 11 (End of Outer Loop): If there exist any unfilled orders in O go to Step 3

This algorithm is followed by a post processing step where order completion rules and a max flow algorithm is used to minimize the waste on each designed slab.

Max Flow Analysis

At the end of the modified set covering step there might exist some orders $O_i$ which are not filled to $_m{}^i$ and some slabs $S_j$ with partial surplus. We call such orders minimally filled orders.

Figure 2:
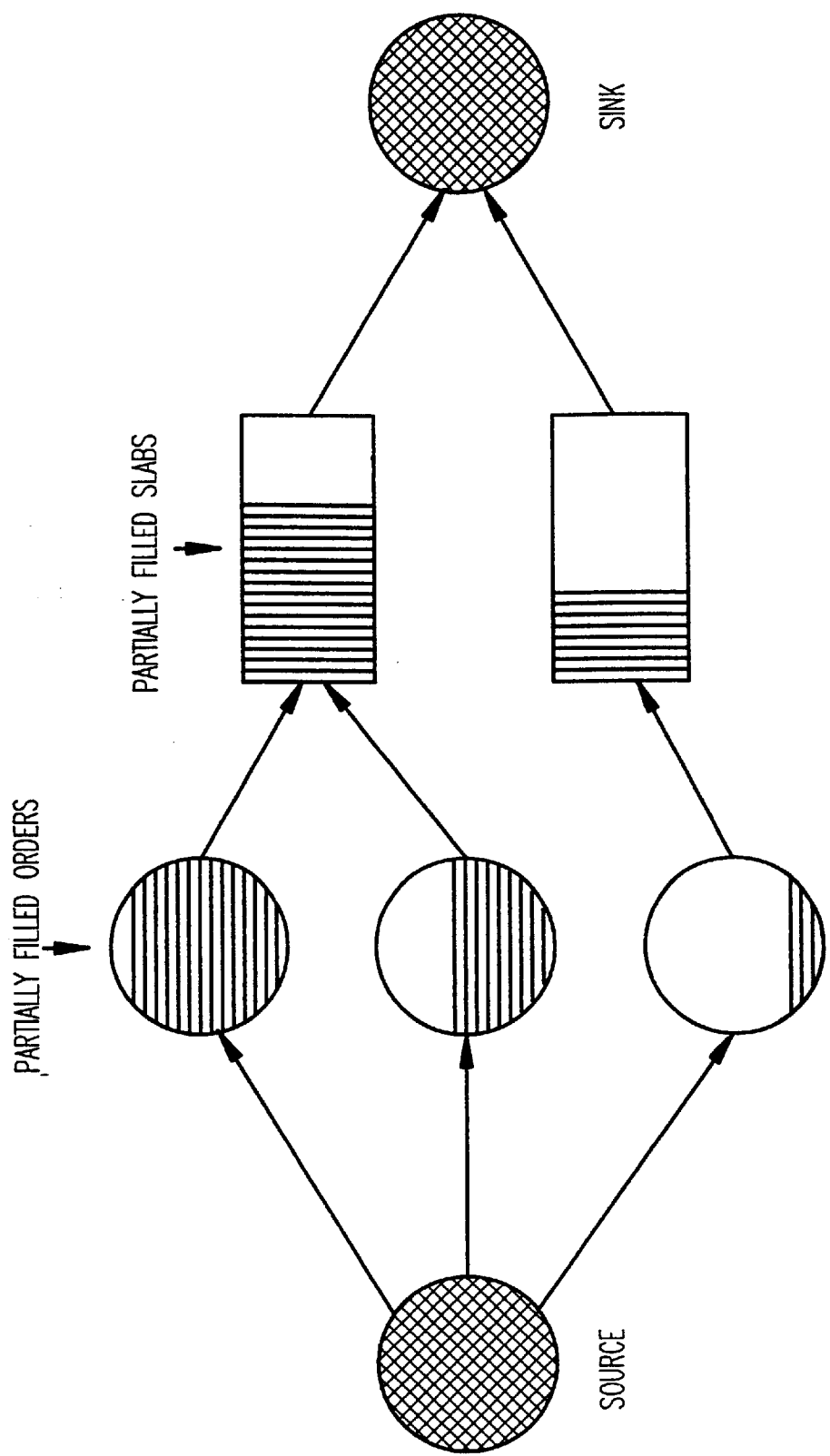
FIG. 2 is a data flow diagram showing a network for maximum flow analysis.

The purpose of the max flow analysis is to improve on the result of the set covering step by increasing the applied weight of such minimally filled orders in order to decrease the partial surplus of the slabs. FIG. 2 shows three such applied orders and the corresponding slabs. As shown in the figure, we construct a network by adding a source node and a sink node. The source node is connected to all the partially filled orders, while all the partially filled slabs are connected to the sink node. The capacities of the arcs are determined as follows:

Capacity of an arc from the source to an order i is:

$$\min \{(DPU_{\max}{}^i - DPU_{size}{}^i) \times DPU_{number}, O_{\max}{}^i - AO^i\}.$$

We now explain the reasons for choosing this value for the capacity: First, we do not wish to change the $DPU_{number}$ since it is restricted to be in integer. Changing the $DPU_{number}$ would involve obeying the integrality restriction which would make this step hard to solve. So, we choose to change the $DPU_{size}{}^i$. Note, again, that at the end of Step 1, for a partially filled order, i, the applied weight $AO_i = DPU_{number} \times DPU_{size}{}^i$. Also, the maximum allowable value for $DPU_{size}{}^i$ is $DPU_{max}{}^i$. Hence, keeping $DPU_{number}{}^i$ to be the same, the maximum additional order weight which can be applied for order i is $(DPU_{max}{}^i - DPU_{size}{}^i) \times DPU_{number}$. However, $O_{max}{}^i - AO^i$ is the total order weight remaining to be applied for order i. The minimum of these two quantities is then the bound on the capacity of the arc.

Capacity of each arc from an order to a slab is ∞.

Capacity of an arc from a slab j to the sink is equal to the partial surplus $PS_j$ of that slab.

Having constructed the network with the above capacities on its arcs, we then find a maximum flow, as described for example by Ahuja, et al., from the source to the sink. In this step, we restrict ourselves to partially filled orders only (and ignore orders which have not been applied at all) because of the color constraints. That is, the maximum flow algorithm does not account for the color constraints and, hence, if we allow orders which have not been applied at all it is possible that the algorithm assigns these orders such that the color constraints are violated.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for slab design from orders while satisfying all given restrictions and achieving near-optimization comprising the steps of:

iteratively applying a set covering algorithm to design slabs from orders while minimizing the number of designed slabs; and applying a maximum flow algorithm as a post processing step to the set covering algorithm step to minimize the number of partial surplus quantities of designed slabs.

2. The computer implemented method for slab design recited in claim 1 wherein the step of iteratively applying a set covering algorithm uses weight for choosing large slabs.

3. The computer implemented method for slab design recited in claim 1 wherein the step of iteratively applying a set covering algorithm comprises the steps of:

assigning a score to each order in an order book that favors orders with few compatible orders, orders that have a small remaining quantity, and orders that have a large maximum manufacturing size;

sorting all orders O in an order book according to the score;

creating a temporary slab list TS and a temporary order list OL;

choosing an order $O_i$ from the sorted orders O having a predetermined value in the sorted order and creating a slab $S_i$ for the order $O_i$;

failing $S_i$ using order $O_i$;

choosing orders compatible with so and entering compatible orders in a list $OL_i$;

filling slab $S_i$ with orders from $OL_i$ until the slab is full; and adding slab $S_i$ to the list of temporary slabs TS.

* * * * *